United States Patent [19]

Otsuka

[11] 4,400,012
[45] Aug. 23, 1983

[54] STEERING COLUMN COVERING SHELL STRUCTURE

[75] Inventor: Hidehiro Otsuka, Tokyo, Japan

[73] Assignee: Nissan Motor Company, Limited, Yokohama, Japan

[21] Appl. No.: 298,192

[22] Filed: Aug. 31, 1981

[30] Foreign Application Priority Data

Sep. 16, 1980 [JP] Japan .................... 55-131542[U]

[51] Int. Cl.³ .................................. B62D 1/18
[52] U.S. Cl. ...................... 280/777; 74/492; 280/779
[58] Field of Search ............... 280/777, 779, 780; 74/492, 493; 285/DIG. 22, 45-46

[56] References Cited

U.S. PATENT DOCUMENTS

| | | | |
|---|---|---|---|
| 2,982,586 | 5/1961 | Gliebe | 285/DIG. 22 |
| 4,086,825 | 5/1978 | Badcock et al. | 280/777 |
| 4,194,411 | 3/1980 | Manabe et al. | 74/492 |
| 4,313,649 | 2/1982 | Morikawa et al. | 285/DIG. 22 |

Primary Examiner—Robert R. Song
Attorney, Agent, or Firm—Lane, Aitken & Kananen

[57] ABSTRACT

A steering column covering shell structure for use with a steering column of a steerable vehicle has a two-piece construction composed of lower and upper shell members which are disconnectably coupled together. By preference, one of the lower and upper shell members has a stress raising wall portion secured to the steering column directly or through the casing of a combination switch assembly mounted on the steering column and enclosed within the shell structure.

2 Claims, 8 Drawing Figures

STEERING COLUMN COVERING SHELL STRUCTURE

FIELD OF THE INVENTION

The present invention relates to a steering column covering shell structure for use with a steering wheel and a steering column of a steerable vehicle such as an automotive vehicle.

SUMMARY OF THE INVENTION

In accordance with the present invention, there is provided a steering column covering shell structure for a steerable vehicle having a body structure, a steering column secured to the body structure and axially collapsible when subjected to axial load, and an instrument panel secured to the body structure, comprising two shell members consisting of lower and upper shell members which are disconnectably held together to form therebetween a hollow space for allowing the steering column to axially extend in part therethrough, the upper shell member having an upward protrusion spaced apart rearwardly from the instrument panel. By preference, one of the two shell members thus constituting the steering column covering shell structure has a stress raising wall portion and is secured to the steering column by means of the stress raising wall portion, the stress raising wall portion being operative to induce concentrated stresses therein when subjected to mechanical load in a direction parallel with the direction in which the steering column axially extends.

BRIEF DESCRIPTION OF THE DRAWINGS

Drawbacks of a prior-art steering column covering shell structure and detailed features and advantages of a steering column covering shell structure according to the present invention will be understood from the following description taken in conjunction with the accompanying drawings in which.

DESCRIPTION OF THE PRIOR ART

Figure 1:
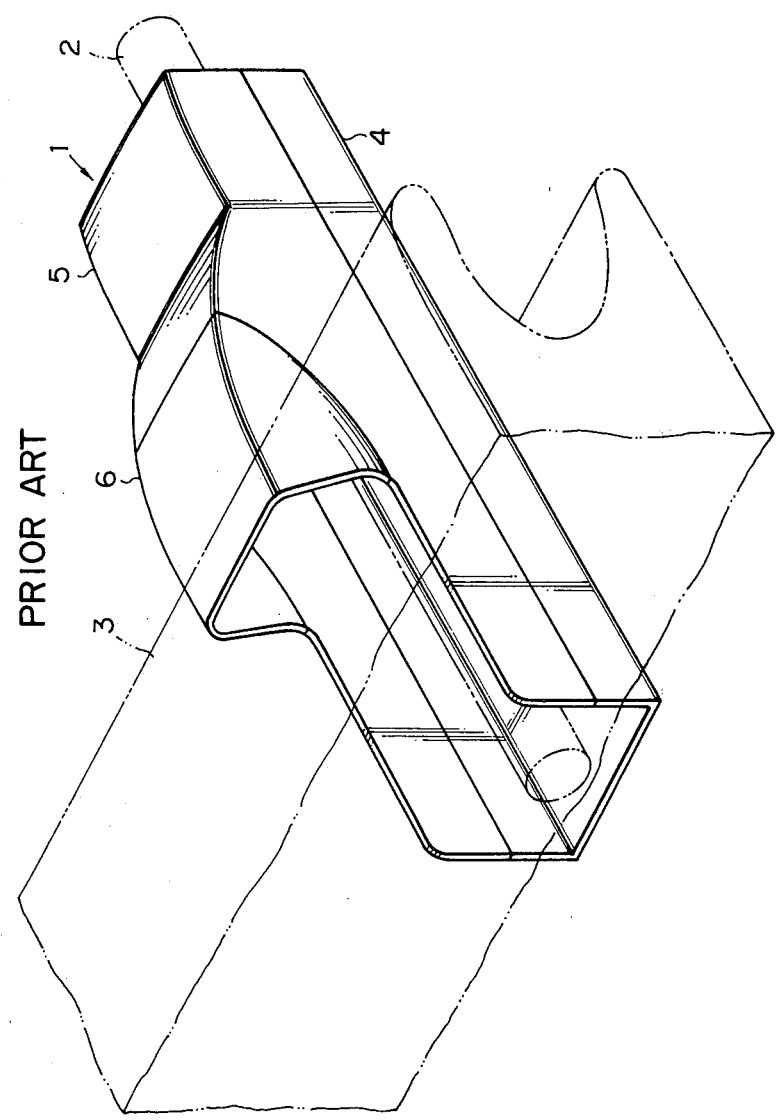
FIG. 1 is a perspective view showing a representative example of a prior-art steering column covering shell structure of the nature to which the present invention appertains.
Figure 2:
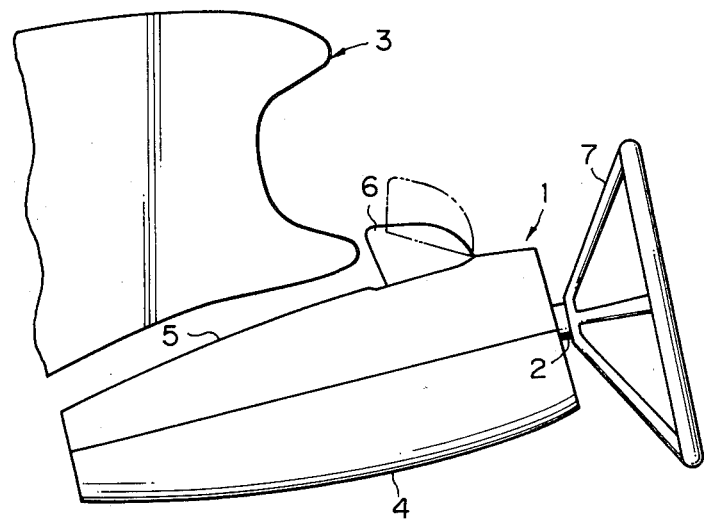
FIG. 2 is a side elevation view showing the arrangement in which the prior-art steering column covering shell structure illustrated in FIG. 1 is installed in combination with a steering column and an instrument panel of an automotive vehicle.

In FIGS. 1 and 2 of the drawings, a prior-art steering column covering shell structure designated in its entirety by reference numeral 1 is shown provided in combination with a steering column 2 and an instrument panel 3 of an automotive vehicle. The steering column 2 axially extends in part through the covering shell structure 1 and is of the type which is axially collapsible when subjected to axial load. The covering shell structure 1 consists of a lower shell member 4 fastened to the steering column 2 by means of screws (not shown), an intermediate shell member 5 fastened to the lower shell member 4 by means of screws (not shown), and an upper shell member 6 coupled to the intermediate shell member 5. The upper shell member 6 extends rearwardly from the vicinity of the lower end of the instrument panel 3 and walls up the gap that would otherwise be formed between the lower end of the instrument panel 3 and the intermediate shell member 5 of the covering shell structure 1.

In the event an automotive vehicle equipped with the steering column covering shell structure 1 thus constructed and arranged encounters a collision at the front of the vehicle, the upper shell member 6 is brought into abutting and pressing contact with the instrument panel 3 and is forced to separate or is dislodged from the intermediate shell member 5 as indicated by phantom lines in FIG. 2. The covering shell structure 1 or, more exactly, the combination of the lower and intermediate shell members 4 and 5 is thus permitted to move forwardly with respect to the instrument panel 3 and permits the steering column 2 to axially collapse and absorb a portion of the thrust energy imparted to the steering column 2 from the vehicle driver being flung toward or against the steering wheel 7 (FIG. 2).

A conventional steering column covering shell structure of the nature hereinbefore described has drawbacks, one of which is that a disproportionately high production cost is required for the fabrication of the covering shell structure which is composed of three component members. Another drawback of the shell structure composed of the three component members is the clumsy external appearance resulting from the unwieldy construction of the structure. Still another drawback is that the upper shell member disconnected from the intermediate shell member might be flung to the vehicle driver's face during a frontal or head-on collision of the vehicle.

The present invention contemplates provision of a steering column covering shell structure which is free from these drawbacks inherent in a prior-art steering column covering shell structure of the described character.

DESCRIPTION OF THE EMBODIMENT

An embodiment of a steering column covering shell structure according to the present invention will be hereinafter described with reference to FIGS. 3 to 8 of the drawings.

Figure 3:
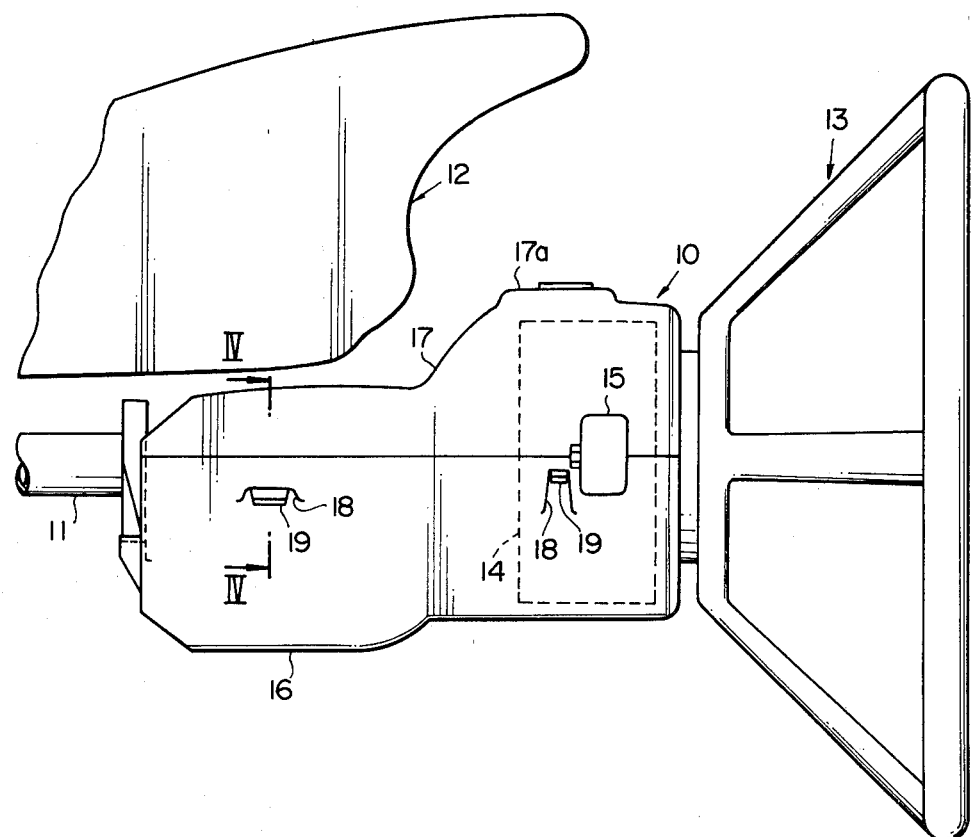
FIG. 3 is a side elevation view showing the arrangement in which a steering column covering shell structure embodying the present invention is provided in combination with a steering column and an instrument panel of an automotive vehicle.
Figure 4:
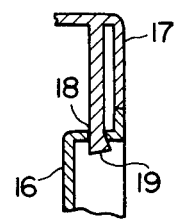
FIG. 4 is a fragmentary cross sectional view taken along lines IV—IV in FIG. 3.

In FIG. 3, a steering column covering shell structure embodying the present invention is generally designated by reference numeral 10 and is shown provided in combination with a steering column 11 and an instrument panel 12. As is customary in the art, the steering column 11 is clamped to the body structure of an automotive vehicle and has a steering wheel shaft (not shown) axially and rotatably supported therein. The steering wheel shaft projects upwardly and rearwardly from the steering column 11 and carries at the upper and rear end thereof a steering wheel 13 which is rotatable with the steering wheel shaft. In the embodiment herein shown, the steering column covering shell structure 10 is assumed to have further enclosed therein a combination switch assembly 14 mounted on the steering column 11 as indicated schematically by dotted lines in FIG. 3. Though not shown in the drawings, the combination switch assembly 14 has a casing having incorporated therein switch units for various electric instruments and appliances such as, for example, headlamps, passing lamps, turn signalling lamps, a windshield wiper, a windshield washer and so forth. The switch units thus incorporated in the switch assembly 14 are manipulated by means of switch control levers 15 projecting outwardly from the side walls of the column covering shell structure 10. The steering column 11 is of the collapsible type which is axially collapsible when subjected to axial load and is thus adapted to absorb a portion of the energy of an impact imparted to the vehicle body during a frontal collision of the vehicle. The construction of such a steering column is well known in the art and, as such, will not be herein described and shown.

The steering column covering shell structure 10 has a two-piece construction and is composed of the combination of two shell members which consist of a lower shell member 16 and an upper shell member 17. One of the two shell members such as the lower shell member 16 as shown is formed with a plurality of slots 18 and the other shell member, viz., the upper shell member 17 has a plurality of hook portions 19. The hook portions 19 engage the lower shell member 16 through the slots 18, respectively, in the lower shell member 16 as will be best seen in FIG. 4 so that the lower and upper shell members 16 and 17 are disconnectably coupled together to constitute the two-piece construction of the shell structure 10. The upper shell member 17 has an upward protrusion 17a spaced apart rearwardly from a lower end portion of the instrument panel 12.

The steering column covering shell structure 10 configured in its entirety as described above is securely connected to the steering column 11 by suitable fastening means. In the shown embodiment of the present invention, the steering column covering shell structure 10 has a stress raising wall portion and is securely connected to the casing of the combination switch assembly 14 by means of the stress raising portion. The stress raising wall portion, which may be formed by either the lower shell member 16 or the upper shell member 17, is herein assumed, by way of example, as being part of the lower shell member 16 as shown in FIGS. 5 and 6 in which the stress raising wall portion is designated by reference numeral 20.

Figure 5:
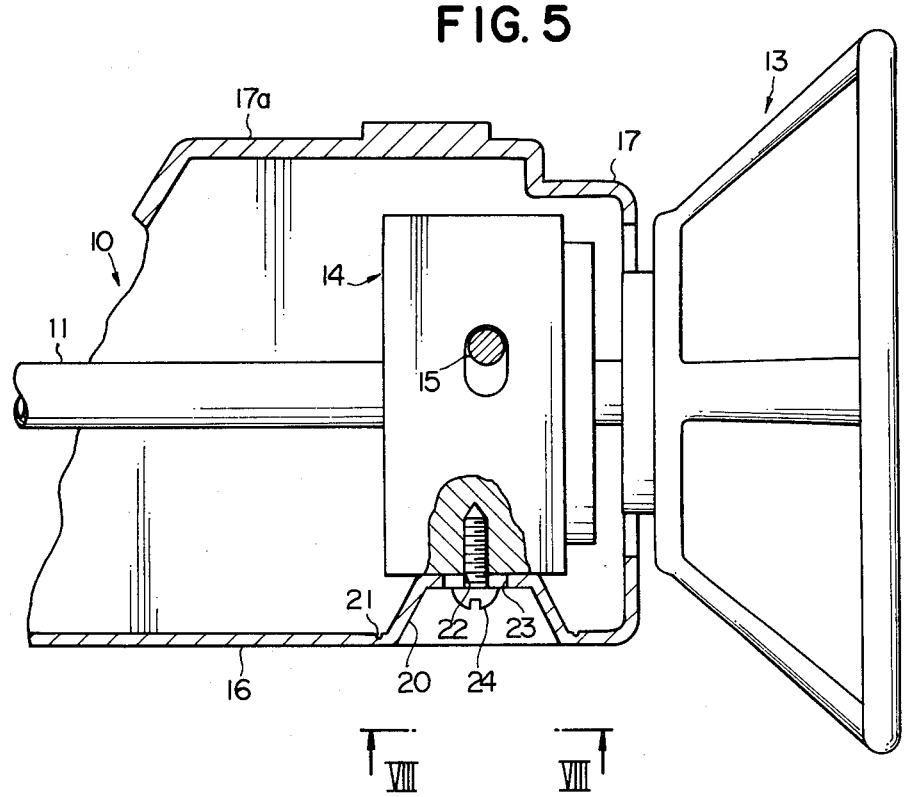
FIG. 5 is a longitudinal sectional view showing, partly in side elevation, the arrangement illustrated in FIG. 3.
Figure 6:
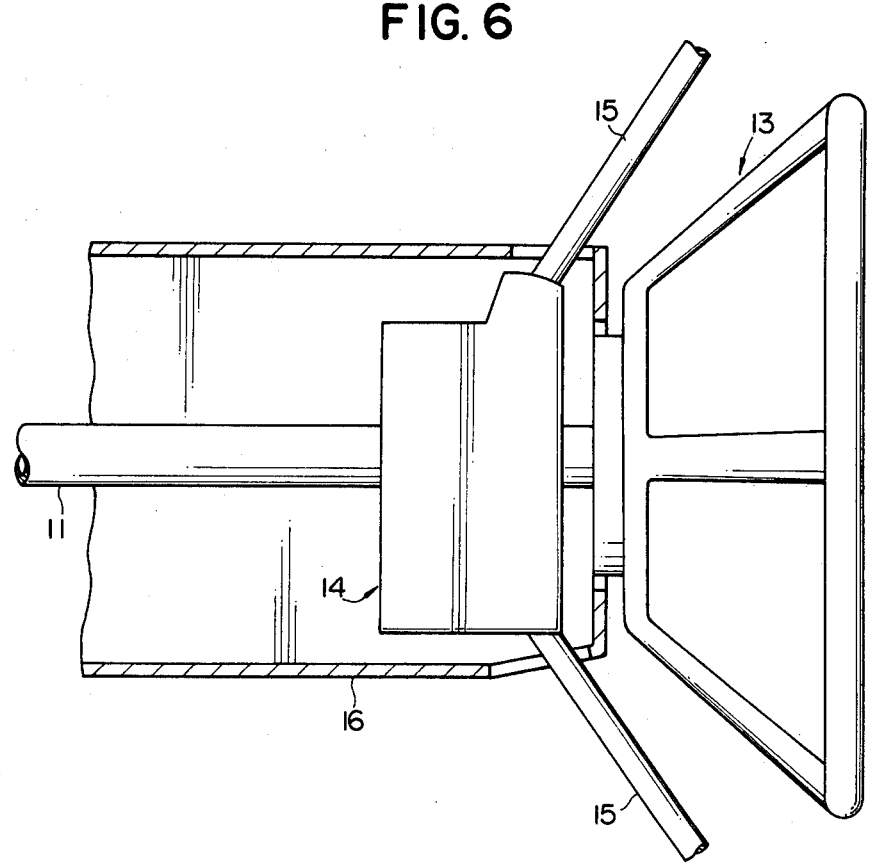
FIG. 6 is a longitudinal sectional view showing, partly in plan view, the arrangement illustrated in FIG. 3.
Figure 7:
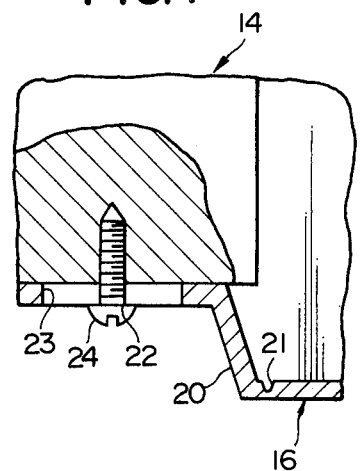
FIG. 7 is a fragmentary sectional view showing, to an enlarged scale, portions of the arrangement illustrated in FIG. 5.
Figure 8:
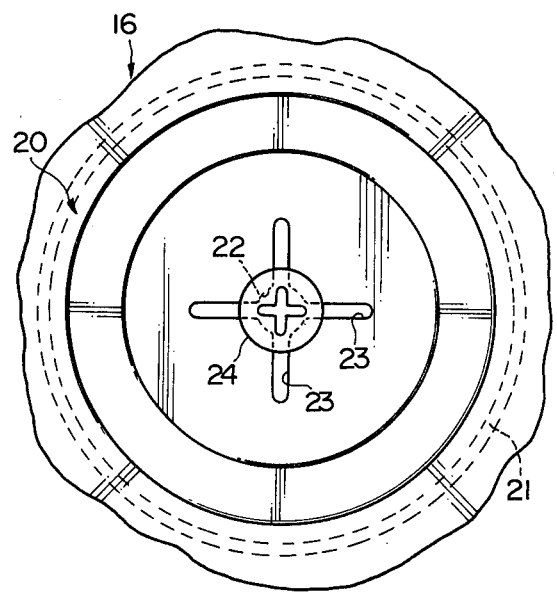
FIG. 8 is a plan view showing a stress raising wall portion of the steering column covering shell structure as viewed from a plane indicated by line VIII—VIII in FIG. 5.

Referring to FIGS. 5 and 6 of the drawings, the stress raising wall portion 20 of the lower shell member 16 is dished in a generally frusto-conical form laterally inwardly of the shell structure 10 and has a substantially flat, center inner surface portion held in contact with the casing of the combination switch assembly 14. As will be better seen from FIGS. 7 and 8 of the drawings, the stress raising wall portion 20 is bounded by an annular groove 21 formed in the lower shell member 16 and coaxially encircling the wall portion 20. The annular groove 21 is shown formed in the inner surface of the shell member 16 by way of example, but may be formed in the outer surface of the shell member 16 if desired. The stress raising wall portion 20 of the lower shell member 16 is further formed with a central aperture 22 located substantially centrally of the wall portion 20 and a suitable number of slots 23 radially extending outwardly from the aperture 22 and angularly spaced apart uniformly from each other about the aperture 22, as will be best seen in FIG. 8. The stress raising wall portion 20 thus configured is securely attached to the casing of the combination switch assembly 14 by means of a screw 24 which is passed through the central aperture 22 in the wall portion 20 and screwed into the casing of the switch assembly 14 with its head portion clamped to the outer surface of the wall portion 20. The screw 24 may be substituted by any rigid fastening element operable similarly to the screw 24.

When, now, the vehicle equipped with the steering column covering shell structure 10 constructed and arranged as hereinbefore described encounters a collision at the front thereof, the steering column 11 and accordingly the shell structure 10 are forced to move forwardly by the thrust energy exerted on the steering wheel 13 from the vehicle driver being flung forwardly on or from the driver's seat. The shell structure 10 being thus moved forwardly with the steering column 11, the upward protrusion 17a of the upper shell member 17 is brought into abutting and thereafter pressing engagement with the lower end portion of the instrument panel 12. As a consequence, the shell structure 10 as a whole is prohibited from being further moved forwardly with respect to the instrument panel 12.

The mechanical load applied axially to the steering column 11 is transmitted through the casing of the combination switch assembly 14 and the screw 24 to the stress raising wall portion 20 of the lower shell member 16 and urge the wall portion 20 to deform in a direction parallel with the axial direction of the steering column 11. Concentrated stresses are thus induced in the vicinity of the annular groove 21 and the radial slots 23 formed in the wall portion 20 so that the stress raising wall portion 20 of the lower shell member 16 is fractured from the remaining portion of the shell member 16 and liberates the combination switch assembly 14 and accordingly the steering column 11 from the restraint by the shell structure 10. The steering column 11 thus released from the shell structure 10 is permitted to move and deform in the axial direction thereof and is axially collapsed by the thrust energy being imparted thereto from the steering wheel 13, thereby absorbing a portion of the thrust energy.

While the lower shell member 16 is being subjected to the axial load transmitted from the steering column 11 and the switch assembly 14 as discussed above, the upper shell member 17 being forced against the lower portion of the instrument panel 12 is forced to deform with respect to the lower shell member 16 which is still secured to the switch assembly 14. It therefore follows that the hook portions 19 of the upper shell member 17 are caused to dislodge from the slots 18 in the lower shell member 16 so that the upper shell member 17 is disengaged from the lower shell member 16. The upper shell member 17 is thus ultimately interposed between the instrument panel 12 and the steering wheel 13 and, for this reason, can not happen to bump against the driver's face or any other part of the vehicle driver.

Each of the annular groove 21, the central aperture 22 and the radial slots 23 in the stress raising wall portion 20 of the lower shell member 16 serves as a stress raiser in which a concentrated stress is induced when the wall portion 20 is subjected to a load urging the wall portion 20 to deform. Such a wall portion 20 has been herein assumed to be secured to the steering column 11 through the casing of the combination switch assembly 14 but, if desired, may be connected direct to the steering column 11 or through any rigid member secured to or integral with the steering column 11.

From the foregoing description, it will have been appreciated that the steering column covering shell structure according to the present invention is characterized primarily in that the shell structure has a two-piece construction composed solely of the lower and upper shell members. By reason of such a simple and compact construction, the steering column covering shell structure according to the present invention is not only economical to manufacture and excellent in external appearance but is free from a danger of hurting a vehicle driver during a frontal collision of a vehicle.

What is claimed is:

1. A steering column covering shell structure for a steerable vehicle having a body structure, a steering column secured to the body structure and axially collapsible when subjected to axial load, and an instrument panel secured to the body structure, said shell structure comprising two shell members consisting of lower and upper shell members which are disconnectably held together to form therebetween a hollow space for allowing said steering column to axially extend in part therethrough, the upper shell member having an upward protrusion spaced apart rearwardly from said instrument panel, one of said shell members having a stress raising wall portion bounded by a continuous groove formed in one of said shell members, said stress raising wall portion being formed with an aperture located inside said groove and a plurality of radial slots radially extending outwardly from said aperture, and angularly spaced apart from each other about said aperture, said steering column having mounted thereon an electric switch assembly including a casing secured to the steering column and enclosed within said upper and lower shell members, said raised wall portion being secured to the steering column by means of a rigid fastening element passed through said aperture and clamped to said stress raising wall portion and said casing.

2. A steering column covering shell structure as set forth in claim 1, in which one of said lower and upper shell members is formed with a plurality of slots and the other of the shell members has a plurality of hook portions respectively engaging said one of the shell members through said slots.

* * * * *